T. E. MURRAY.
METAL VEHICLE WHEEL.
APPLICATION FILED APR. 24, 1916.
1,206,886.
Patented Dec. 5, 1916.
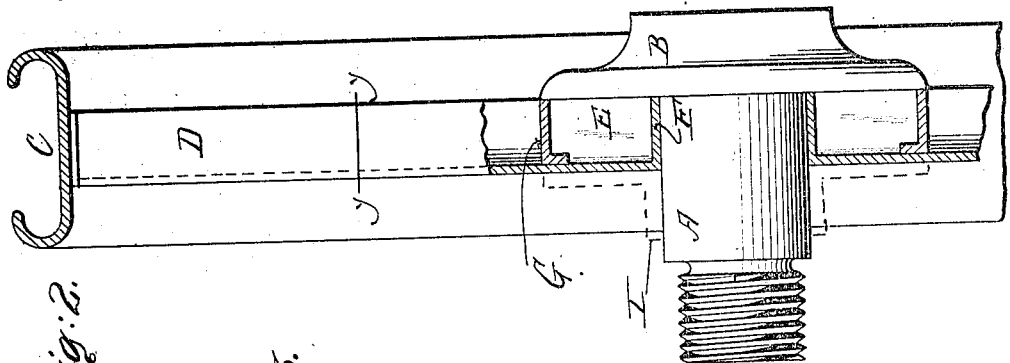
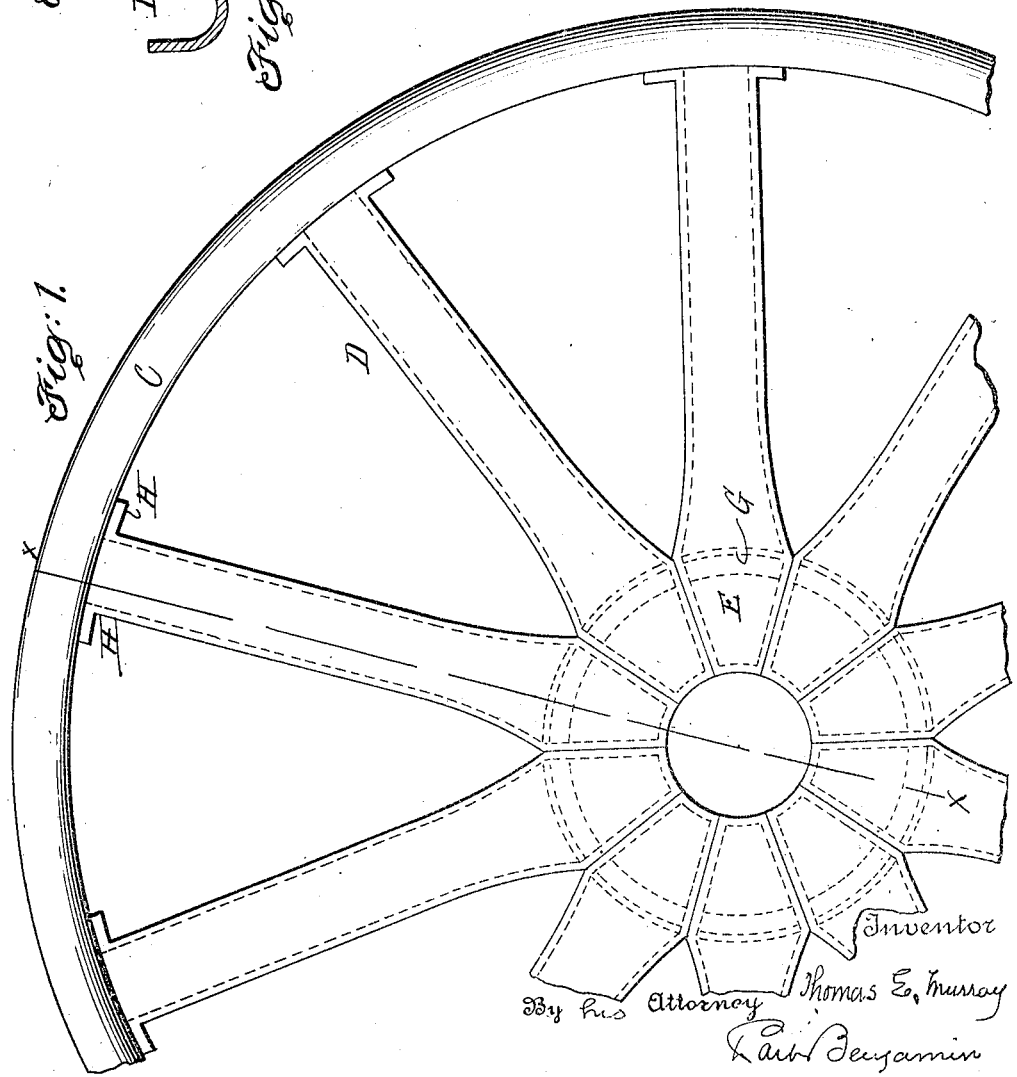

UNITED STATES PATENT OFFICE.

THOMAS E. MURRAY, OF NEW YORK, N. Y.

METAL VEHICLE-WHEEL.

1,206,886.  Specification of Letters Patent.  Patented Dec. 5, 1916.

Application filed April 24, 1916. Serial No. 93,140.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention is a metal wheel for vehicles, and consists in the construction of the spokes, whereby the manufacture is cheapened and simplified.

In the accompanying drawings—Figure 1 is an elevation of a part of a metal vehicle wheel embodying my invention. Fig. 2 is a section on the line $x$, $x$ of Fig. 1. Fig. 3 is a section of one of the spokes on the line $y$, $y$ of Fig. 2.

A is the cylindrical hub, having the usual flange B.

C is the rim.

The body portion D of each spoke is formed by bending a plate longitudinally into channel or arch form in cross section, with its edges lying in the same plane, Fig. 3. At its inner portion E the spoke is enlarged and is of frusto-wedge shape, so that when the inclined sides of the several spokes are placed in juxtaposition to form the wheel and welded together, an annular nave will be produced, which receives the cylindrical hub. The inner extremity of each spoke may be closed by a curved wall F, which may be made integral with the remainder of said spoke. Within the body portion of said spoke is a transverse partition G which coincides with the circumferential periphery of hub flange B when the spoke is in place. Said partition thus closes the pocket which otherwise would exist between the inner portion E of the spoke and flange B. The rim C is secured to the spokes by any suitable means—here shown as side flanges H formed on the spokes and welded to the inner surface of said rim.

The wheel body, formed as described, is removably secured in place by the usual removable flanged outer collar, indicated by dotted lines at I in Fig. 2. If it be desired to secure the wheel permanently in place on the hub, the edges of partition G and of the enlarged inner portion E may be welded to the hub flange B.

The wheel is disposed on the hub with the rounded or convex sides of the spokes outward, so that its appearance is that of a wheel having tubular spokes. Among advantages of spokes when made, as described, in channeled or arched form, are that they are much cheaper to manufacture than tubular spokes, while they posses all necessary strength. The rotation of the wheel tends to throw mud out of the spoke channels, but in any event they are easily cleaned.

I claim:

1. A spoke for metal vehicle wheels of channel-shaped cross section and closed at its inner end, and a transverse partition in said spoke in proximity to said inner end.

2. A metal vehicle wheel, comprising an annular nave, spokes of channel-shaped cross section radiating from said nave, and transverse partitions in said spokes unitedly forming the outer circumferential wall of said nave.

3. A metal vehicle wheel formed of a plurality of radiating metal spokes, each of channel-shaped cross section and approximated at their inner portions to form an annular nave, and a transverse partition in each of said spokes, the said partitions unitedly forming a circumferential wall for said nave.

4. A metal vehicle wheel formed of a plurality of radiating metal spokes, each of channel-shaped cross section and having its inner portion enlarged and of frusto-wedge form, the said inner portions being approximated to form an annular nave, walls closing the inner extremities of said spokes and forming the inner circumferential wall of said nave, and transverse partitions in said spokes unitedly forming the outer circumferential wall of said nave.

5. A spoke for metal vehicle wheels, consisting of a metal plate having its body portion of channel-shaped cross section and its inner portion of a cross section different from that of said body portion, and a transverse partition in said spoke dividing said body portion from said inner portion.

In testimony whereof, I have affixed my signature in presence of two witnesses.

THOMAS E. MURRAY.

Witnesses:
 GERTRUDE T. PORTER,
 MAY T. McGARRY.